Patented Apr. 6, 1937

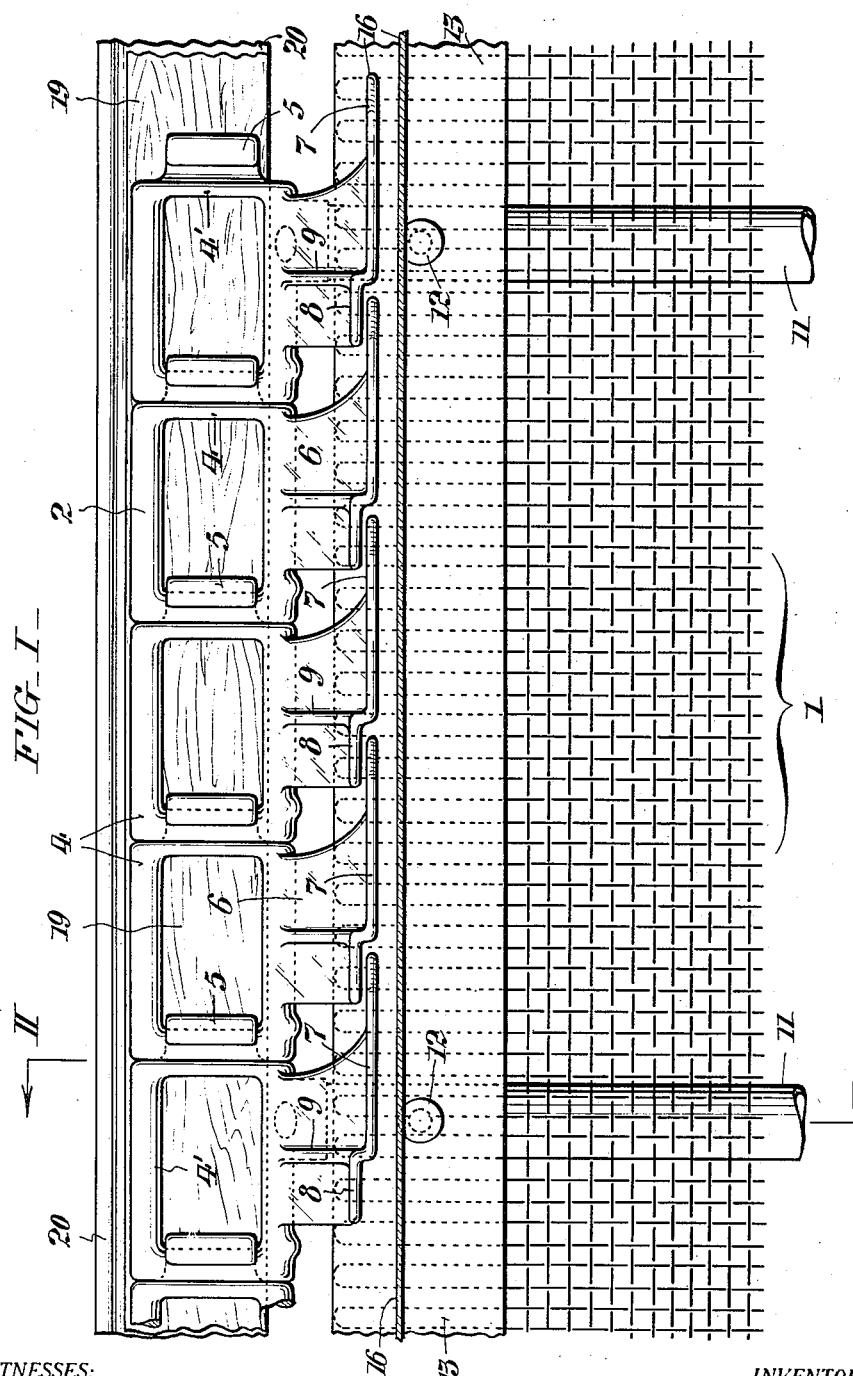

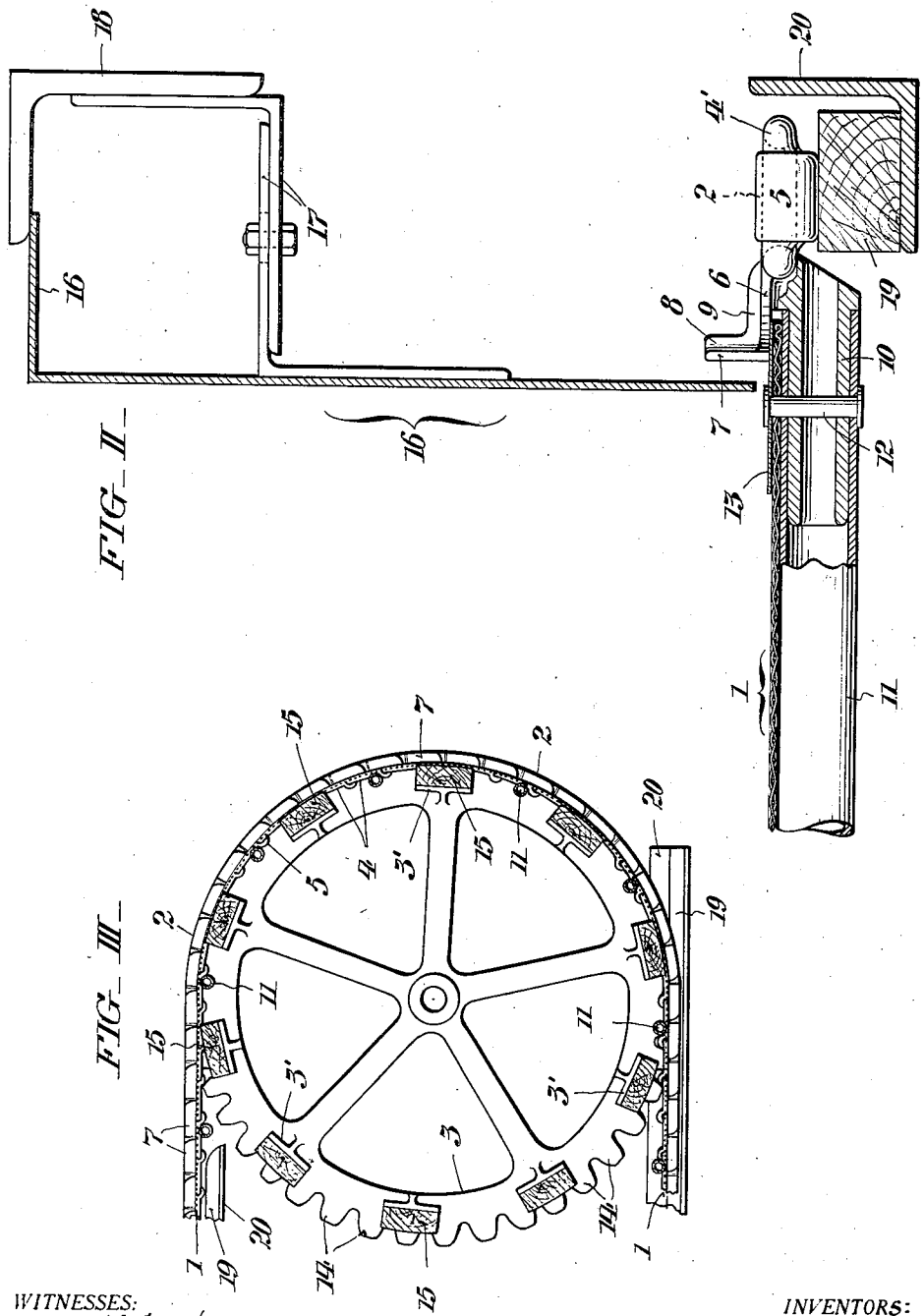

2,076,506

UNITED STATES PATENT OFFICE 2,076,506

CONVEYER

Walter W. Sibson and Harold H. Belcher, Philadelphia, Pa., assignors to The Philadelphia Drying Machinery Company, Philadelphia, Pa., a corporation of Pennsylvania Application January 30, 1935, Serial No. 4,045

10 Claims. (Cl. 198—194)

This invention relates to conveyers such as are generally used for transporting fibrous materials and the like in loose or bulk form through treating apparatus, such as drying and other conditioning machines. In some of the known types of such conveyers, it frequently happens that when loaded with material to a proper depth toward the center of the conveyer apron, it is necessary to have a much thinner layer proximate the sides therof, with resultant loss in transporting capacity as well as incidental uneven treatment or drying of such material.

Again, in some of the known conveyers where the aprons are made merely of wire mesh and passed around drums or cylinders at opposing ends of the machine, such conveyers are subject to considerable tension and, when operating, frequently move laterally to one side or the other; and, as nothing was provided to prevent such movement, the longitudinal edges of such conveyers often engaged the framework or side guards of the supporting structure with resultant damage to the conveyer apron, loss of the material being handled, as well as danger of the latter clogging up moving parts of the machine.

In instances where the conveyer apron has been of the sectional type or composed of perforated plates much difficulty has been experienced in overcoming the objectionable opening set up between the successive sections when rounding the rotary supports therefor, owing to such openings becoming filled with loose material and resultant loss.

The primary object of our invention is to overcome the noted disadvantage of known conveyer structures in a simple and effective manner by provision of a novel conveyer apron having a continuous unbroken surface.

Another object is the provision of a new type conveyer equipment in which the apron supporting elements always progress in alignment through the machine, while the tractive load is carried thereby and not by the apron itself.

Our invention also possesses other objects and features of advantage some of which, in addition to the foregoing, will be set forth in the following explanation thereof; and, it consists essentially in the construction and combinations of parts and details as hereinafter fully described, and finally pointed out in the claims.

In order that our invention may be clearly understood and carried into practical effect reference will now be made to the accompanying sheets of drawings, in which like characters of reference designate the same or corresponding parts in all the views.

Fig. I is a fragmentary plan of our improved conveyer.

Fig. II is a sectional view, taken as indicated by the arrows II—II on Fig. I; and, Fig. III is a sectional view at one end of the conveyer.

Referring more in detail to the drawings, it is to be noted that the improved conveyer comprises a continuous apron 1, preferably an uninterrupted length of woven wire cloth of the desired mesh, the same being carried by parallel endless chains 2, trained about drums with end sprockets 3 (Fig. III), in the known manner, only one of said sprockets 3 and chains 2 being shown in order to avoid unnecessary illustration. The endless chains 2 preferably comprise detachable plain and special links 4, 4', respectively, each having an end pivot-projection or lug 5, and an inwardly-directed flange 6 with an upward projection or lip 7, for a purpose later on explained. It will be observed that the link lips 7 are stepped at their leading ends 8 to afford ample overlap with respect to the confronting trailing ends of said lips, as the chains 2 progress and pass around the sprockets 3, to the effective preclusion of edge-spill of material being conveyed by the apron 1; and said link lips are strengthened by outwardly-directed reinforcements 9.

Conveniently formed integral with and laterally-extending from the special chain links 4' are hollow projections 10 for snug reception of the ends of the apron-supporting and chain-connecting transverse tubular-girts 11; said girts being firmly secured to the chain link projections 10 and the conveyer apron 1 by means, such as rivets 12. Continuous metal bands or strips 13 are provided at each side of the conveyer apron 1 and held in place by the rivets 12, as best appreciated from Fig. II. These strips 13 not only reinforce and strengthen the selvages of the apron 1, but they also provide a substantial means for attachment of said apron to the endless chain link projections 10; while it is to be particularly remarked that the tractive plane of the apron 1 is located as closely as possible to the pitch line of the endless chains 2 and sprockets 3, by the link projections 10, so as to avoid any possibility of buckling, lifting, or breaking, of the apron 1. It will also be obvious that if the apron 1 were fastened directly to the chain links 4 without using the strips 13, such fastenings would be more or less insecure, whereas by use of said strips the apron 1 is held firmly with a minimum tendency to flex.

Attention is also directed to the sprockets 3 which are not only formed with teeth 14 to receive and progress the chains 2, but they are connected by circumferentially-spaced longitudinal connecting lags 15, suitably secured to brackets 3' projecting from said sprockets and affording intervening open spaces so that the pipe girts 11 will be accommodated in such open spaces, and at the same time the conveyer apron 1 is supported on the lags 15—while rounding the conveyer ends—in a position corresponding substantially with the pitch line of the endless chains 2 and the sprocket teeth 14. It is also to be remarked that the lags 15 are of a width, as shown in Fig. III, to preclude the formation of any angular bends in the apron as it passes around the sprockets 3.

In combination with the conveyer means above described, we preferably make use of sheet metal guards 16, Fig. II, for confining the material being handled therebetween during progression through the drying enclosure, and enabling such material to be spread to a uniform depth across the width of the apron 1. These guards 16, it will be seen, are longitudinally reinforced by angle sections 17, whereby they are adjustably connectable to longitudinal rails 18 in the machine structure; and it is to be remarked said guards extend downwardly into close proximity with the apron 1 and confronting coaction with respect to the chain link upward lips 7 so that side "spill" is avoided. Thus it will be seen that there is provided a practically continuous container or trough for the material being transported by the conveyer apron 1.

The endless chain flights intermediate the sprockets 3 ride along rails 19, preferably of wood, conveniently supported by longitudinal track angles 20, provided for the purpose in accordance with known practice, and in this connection it is to be noted the chain link lugs 5 are rounded and project below the plane of the links 4, 4', so as to minimize tractive friction and ensure easy progression of the conveyer apron 1 along the rails 19. Furthermore, the link flanges 6, intermediate the girt connections 12, by coaction with the strips 13, serve to retain the apron in alignment and prevent its lifting, as clearly obvious from Figs. I and II.

From the foregoing it is thought the merits and advantages of our improved conveyer and coactive guard equipment for machines designed more particularly for the treatment of fibrous material and the like will be fully appreciated without further amplification herein. Also, while we have illustrated a preferred embodiment of the invention, it will be apparent, to those skilled in the art, that modifications can be made therein without departing from the scope of our invention as expressed in the following claims.

Having thus described our invention, we claim:

1. An apron conveyer comprising a continuous woven wire cloth apron; a pair of endless chains of plain links with special links at intervals thereof, all of said links having inner flanges and the special links being connected by transverse girts and to which the apron is attached for progression in a plane substantially coincident with the pitch line of said chains; and pairs of sprockets at the conveyer ends about which the link-chains pass, each said pair of sprockets being connected together by circumferentially-spaced longitudinal lags of a width to afford substantial bearing for the apron, with intervening clearances for the transverse girts.

2. An apron conveyer comprising a continuous woven wire cloth apron; a pair of endless chains of plain links with special links at regular intervals thereof, all of said links having inner flanges and the special links being connected by transverse girts and to which the apron is secured; continuous selvage reinforcing strips along the apron longitudinal edges; and end rotary supports for the conveyer, each said support including a pair of sprockets connected together by comparatively wide circumferentially-spaced longitudinal lags secured to brackets projecting from said sprockets, whereby the endless apron is maintained in alignment with the pitch line of the link-chains and sprockets and prevented from angular deflection while rounding the latter.

3. An apron conveyer comprising a flexible continuous apron; a pair of endless link-chains having lateral flanges overlapping the apron edges, said chains including special links at intervals with lateral projections, for reception of transverse girts at intervals for spacing said chains and supporting the apron so that its tractive plane substantially coincides with the pitch line of the chains; flexible selvage reinforcing strips continuous with the apron longitudinal edges; and means securing the apron edges, reinforcing strips, girts and registering chain link lateral projections together.

4. An apron conveyer comprising a continuous woven wire cloth apron; a pair of laterally-spaced endless chains of plain links with special links at regular intervals thereof, all of said links having inner flanges and the special links being connected by transverse girts, said girts supporting the apron substantially coincident with the endless chain pitch lines throughout their extent; flexible selvage reinforcing strips of metal continuous with the apron longitudinal edges; means securing the apron edges and reinforcing strips to the transverse girts; a pair of sprockets at each end of the conveyer for support and progression of the link chains, and circumferentially-spaced comparatively wide longitudinal lags intermediately secured to lateral brackets on the respective pairs of sprockets for support of the endless apron with provision of intervals to accommodate the transverse girts and to prevent angular deflection of the apron when passing around said sprockets.

5. An apron conveyer comprising a flexible endless apron; a pair of laterally-spaced endless chains including plain rectangular links with special rectangular links at intervals, said special links having lateral projections for reception of girts to support the apron coplanar with the endless chain pitch lines and to which the edges of the apron are attached; and all of the links having upstanding stepped-lips with outwardly-directed reinforcements, said lips jointly forming substantially-continuous side guards for the apron to prevent edge-spill of the material being conveyed.

6. An apron conveyer comprising a flexible endless apron, a pair of laterally-spaced endless chains including plain links and special links at intervals, all of the chain links having lateral flanges jointly providing an approximately continuous overlap along the apron edges, and each of the special links having a lateral projection for reception of girts for attachment and support of the endless apron substantially in the pitch line of chain progression and to prevent its buckling.

7. An apron conveyer comprising spaced chains including plain and special links at spaced intervals, the links whereof are provided with inward-projecting flanges; lateral projections below the flanges of the special links affording engagement for transverse chain-connecting girts; a foraminous-material apron supported by the girts; flexible selvage-reinforcing strips continuous with the apron longitudinal edges and engaging the chain link projecting flanges to retain said apron substantially in the pitch line of chain progression; and means securing the reinforcing strips and apron to the chain lateral projections aforesaid.

8. An apron conveyer comprising spaced detachable-link chains, each said chain including plane and special links at intervals, all of which have an inwardly-directed flange; similarly-directed projections below the special links affording engagement for transverse chain-connecting tubular-girts; a foraminous-material apron supported by the girts; flexible selvage-reinforcing strips along the apron edges and coacting with the chain projecting flanges to retain said apron substantially in the pitch line of chain progression; and means securing said flexible strips and foraminous apron to the tubular girts and chain lateral projections aforesaid.

9. An apron conveyer comprising spaced detachable-link chains, each said chain including plane and special links at spaced intervals, all of said links having a pivot-lug at one end and an inwardly directed flange; similarly-directed projections integral with and below the special chain link flanges affording engagement for transverse chain-connecting tubular-girts; a flexible endless perforate apron supported by the girts; flexible selvage-reinforcing sheet metal strips along the apron edges for coaction with the bottom of the chain projecting flanges to hold the apron substantially in the pitch line of chain progression; and means securing the flexible strips and apron to the tubular girts and special link projections aforesaid.

10. An apron conveyer comprising spaced detachable-link chains, each said chain including plane and special links at intervals, all of said links having a pivot-lug at one end and an inwardly directed flange with an upstanding stepped-lip affording ample side overlap during progression of the chains; similarly-directed projections integral with and below the chain special link flanges affording engagement for transverse chain-connecting tubular-girts; a flexible endless perforate apron supported by the girts; flexible selvage-reinforcing sheet metal strips along the apron edges for coaction with the bottom of the chain projecting flanges to hold the apron substantially in the pitch line of chain progression; and means securing the flexible strips and apron to the tubular girts and special link projections aforesaid.

WALTER W. SIBSON.
HAROLD H. BELCHER.